(12) United States Patent
Tanaka et al.

(10) Patent No.: US 7,717,394 B2
(45) Date of Patent: May 18, 2010

(54) VEHICLE INTERIOR ACCESSORY RETAINER

(75) Inventors: Yoshito Tanaka, Fujieda (JP); Masahiko Ito, Fujieda (JP); Yoshitake Nakazawa, Fujieda (JP); Akira Fukai, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 574 days.

(21) Appl. No.: 11/626,000

(22) Filed: Jan. 23, 2007

(65) Prior Publication Data

US 2007/0228247 A1 Oct. 4, 2007

(30) Foreign Application Priority Data

Mar. 31, 2006 (JP) ............................. 2006-097546

(51) Int. Cl.
*F16M 13/00* (2006.01)
(52) U.S. Cl. ........................................ 248/549; 248/479
(58) Field of Classification Search .............. 248/475.1, 248/481
See application file for complete search history.

(56) References Cited

U.S. PATENT DOCUMENTS

| | | | | |
|---|---|---|---|---|
| 4,632,348 A | * | 12/1986 | Keesling et al. | ........ 248/222.11 |
| 4,668,059 A | * | 5/1987 | Ohyama | ..................... 248/549 |
| 5,330,149 A | | 7/1994 | Haan et al. | |
| 5,377,948 A | | 1/1995 | Suman et al. | |
| 5,377,949 A | | 1/1995 | Haan et al. | |
| 5,820,097 A | | 10/1998 | Spooner | |
| 5,931,440 A | | 8/1999 | Miller | |

FOREIGN PATENT DOCUMENTS

| | | |
|---|---|---|
| EP | 1 524 158 A1 | 4/2005 |
| JP | 6-507364 | 8/1994 |
| JP | 2003-118486 | 4/2003 |
| WO | WO 93/16900 | 9/1993 |
| WO | WO 03/041999 A1 | 5/2003 |

OTHER PUBLICATIONS

U.S. Appl. No. 12/183,626, filed Jul. 31, 2008, Tanaka, et al.

* cited by examiner

*Primary Examiner*—Gwendolyn Baxter
(74) *Attorney, Agent, or Firm*—Oblon, Spivak, McClelland, Maier & Neustadt, L.L.P.

(57) ABSTRACT

A vehicle interior accessory retainer includes a base, a base inner and a plate spring. In the base inner, upper and front openings are formed in upper and front parts, respectively, side walls are formed in side parts in the upper opening, a lower part is formed at a position opposite to the upper opening with the side walls in between, and a stay mount part is provided in the lower part. The plate spring has a planar portion, upright portions, and base-retaining pieces. The stay mount part has a projection. A nip part is formed between the projection and the lower part of the base inner. A through hole is formed in the planar portion in the plate spring. A tension applying part is formed between the upper surface of the lower part in the base inner and the projection in the stay mount part.

8 Claims, 9 Drawing Sheets

(a)

(b)

(a)

(b)

VEHICLE INTERIOR ACCESSORY RETAINER

BACKGROUND OF THE INVENTION

1. Field of the Invention

The present invention relates to a vehicle interior accessory retainer for retaining an accessory in a vehicle interior, e.g., a vehicle interior mirror or a television camera.

2. Related Background Art

A vehicle interior mirror for rearview is provided in a vehicle interior. Recently, there are cases where the vehicle interior mirror, a television camera, etc. are provided in the vehicle interior, in order to improve the functionality of vehicle. Such an accessory is attached to a part of the vehicle interior, e.g., a ceiling or an instrument panel. These accessories are structured so as to be detached from the mount part in the vehicle interior, in order to prevent breakage thereof upon exertion of large impact, e.g., collision with an occupant's head in the event of vehicle collision or the like.

However, if during normal times the accessory is easily detached from the mount part in the vehicle interior, attachment thereof will require some labor and time. For this reason, the vehicle interior accessory retainer described in Patent Document 1 has such a structure that during normal times the accessory is retained with some load and that the accessory is detached only when an impact force over a predetermined magnitude is exerted. Therefore, it is excellent in impact relaxation and is able to securely retain the accessory. Examples of other vehicle interior accessory retainers include an inner mirror device for vehicle disclosed in Patent Document 2, and a dropout rearview mirror mounting bracket disclosed in Patent Document 3.

[Patent Document 1] International Application Published under PCT WO 2003/041999
[Patent Document 2] Japanese Patent Application Laid-Open No. 2003-118486
[Patent Document 3] Published Japanese Translation of PCT Application No. Hei.6-507364

SUMMARY OF THE INVENTION

In the vehicle interior accessory retainer disclosed in the aforementioned Patent Document 1, however, a base inner is mounted on a base by use of a linear spring. For this reason, it had the problem that if the base inner deteriorated with age or by heat, the retaining load by the linear spring decreased, so as to degrade vibration resistance.

An object of the present invention is therefore to provide a vehicle interior accessory retainer capable of securely retaining an accessory, resistant to deterioration with age and by heat, and capable of preventing reduction in the retaining load.

A vehicle interior accessory retainer according to the present invention, which achieved the above object, comprises a base to be fixed in a vehicle interior; a base inner in which an upper opening and a front opening are formed in an upper part and in a front part, respectively, in which side walls are formed in side parts facing each other with the front opening in between in the upper opening, in which a lower part is formed at a position opposite to the upper opening with the side walls in between, and in which a stay mount part, on which a stay in an accessory body is to be mounted, is provided in the lower part; and a plate spring mounted on the base inner and arranged to retain the base in the base inner; wherein the plate spring has a planar portion arranged along an upper surface of the lower part in the base inner, upright portions standing upright from both sides of the planar portion and arranged along the side walls in the base inner, and base-retaining pieces formed as directed inward from the upright portions.

In the vehicle interior accessory retainer according to the present invention, the upper opening and the front opening are formed in the base inner. The provision of this upper opening permits the base inner to be mounted on the base, and the provision of the front opening permits the base inner to be mounted as slid onto the base; therefore, they facilitate an assembling work.

The plate spring is used for the base inner to retain the base. This plate spring has the planar portion arranged along the upper surface of the lower part in the base inner, and the upright portions formed as standing upright from the both sides of the planar portion and arranged along the side walls in the base inner. For this reason, it can be securely mounted along the side walls and the lower part in the base inner. In addition, the base-retaining pieces are formed as directed inward from the upright portions and the base-retaining pieces retain the base in the base inner. Since the base is retained by the plate spring in this manner, the base inner becomes unlikely to deteriorate with age and by heat, and thus the retaining force can be maintained. Therefore, it is feasible to prevent reduction in the retaining load.

The vehicle interior accessory retainer can be constructed in a form wherein the stay mount part has a projection projecting from the lower part toward the upper part of the base inner, wherein a nip part for nipping the planar portion in the plate spring is formed between the projection and the lower part of the base inner, wherein a through hole for letting the projection in the stay mount part pass is formed in the planar portion in the plate spring, and wherein a tension applying part for applying a tension is formed between the upper surface of the lower part in the base inner and the projection in the stay mount part.

When the stay mount part has the projection projecting from the lower part toward the upper part of the base inner as described above, it is feasible to prevent an increase in the size of the base inner itself even if the stay mount part becomes large. In this form, there is a concern about interference between the plate spring and the stay mount part, but the interference between the plate spring and the stay mount part can be prevented because the through hole for letting the projection in the stay mount part pass is formed in the plate spring. In addition, the planar portion in the plate spring is provided with the tension applying part for applying the tension between the upper surface of the lower part in the base inner and the projection in the stay mount part. For this reason, the plate spring can be mounted more securely on the base inner. In addition, since the nip part for nipping the planar portion in the plate spring is formed between the projection and the lower part of the base inner, the plate spring can be mounted still more securely on the base inner.

The vehicle interior accessory retainer can also be constructed in a form wherein a groove for receiving the tension applying part is formed in the upper surface of the lower part in the base inner. When this groove is formed, the plate spring can be located at an appropriate position relative to the base inner.

Furthermore, the vehicle interior accessory retainer can be constructed in a form wherein a load adjusting structure is formed in the upright portions in the plate spring. When this load adjusting structure is formed, it becomes easy to perform load design according to materials of the base inner, the plate spring, and so on.

The vehicle interior accessory retainer can also be constructed in a form wherein at least one of the base and the plate spring is made of metal. When at least one of the base and the plate spring is made of metal, a coefficient of friction can be decreased between the base and the plate spring. Therefore, the base inner can be mounted as smoothly slid onto the base.

The vehicle interior accessory retainer can be constructed in a form wherein the plate spring is coated with a lubricating coating. When the plate spring is coated with the lubricating coating in this manner, the base inner can be mounted as slid more smoothly onto the base.

The vehicle interior accessory retainer according to the present invention is able to securely retain the accessory, resistant to deterioration with age and by heat, and able to prevent reduction in the retaining load.

DESCRIPTION OF THE PREFERRED EMBODIMENTS

Figure 1:
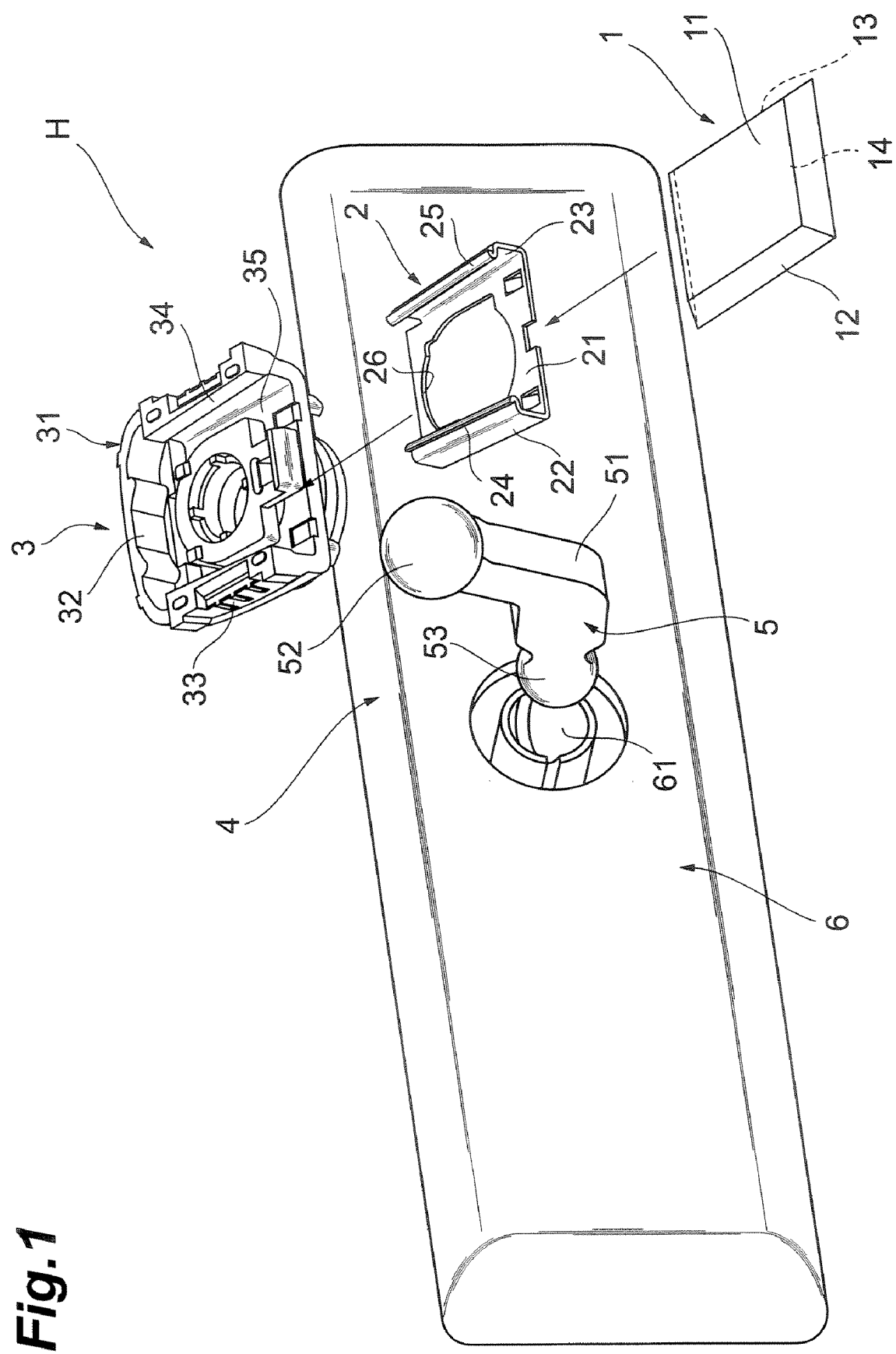
FIG. 1 is an exploded perspective view of a vehicle interior accessory retainer according to the present invention.

An embodiment of the present invention will be described below with reference to the drawings. FIG. 1 is an exploded perspective view of a vehicle interior accessory retainer according to the present invention, FIG. 2(a) a perspective view of a plate spring, FIG. 2(b) a perspective view of a base inner, FIG. 3 a plan view of the base inner, FIG. 4 a sectional view corresponding to a cross section along line IV-IV in FIG. 3 in a state in which the plate spring is incorporated in the base inner and in which the base inner is mounted on the base, and FIG. 5 a sectional view corresponding to a cross section along line V-V in FIG. 3 in a state in which the plate spring is incorporated in the base inner and in which the base inner is mounted on the base.

As shown in FIG. 1, the vehicle interior accessory retainer H according to the present embodiment is composed of a base 1, a plate spring 2, a base inner 3, and a mirror assembly 4.

The base 1 is, for example, a metal member and a principal cross section thereof is approximately an isosceles trapezoid. The upper surface of the base 1 is, for example, a bond surface 11 to be bonded to an automotive windshield F (cf. FIG. 8). Contact surfaces 12, 13 extending obliquely are provided on both sides of the bond surface 11, and the lower edges of the contact surfaces 12, 13 are connected to each other through a lower surface 14. This lower surface 14 has an area wider than the bond surface 11, and thus the principal cross section of the base 1 is the isosceles trapezoid.

Figure 2:
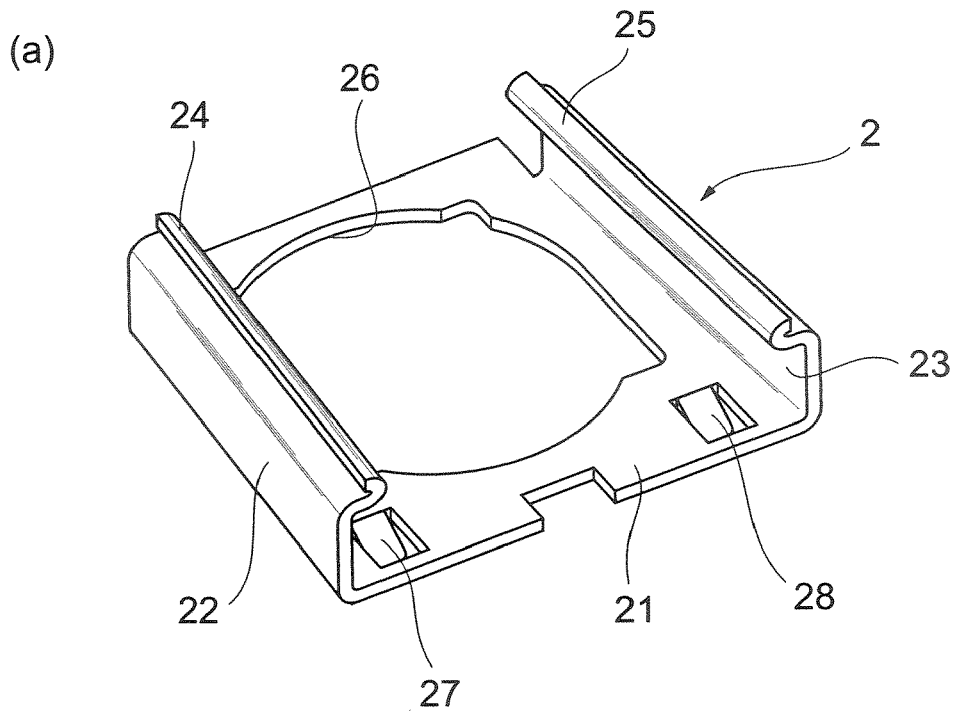
FIG. 2 includes (a) a perspective view of a plate spring and (b) a perspective view of a base inner.
Figure 2:
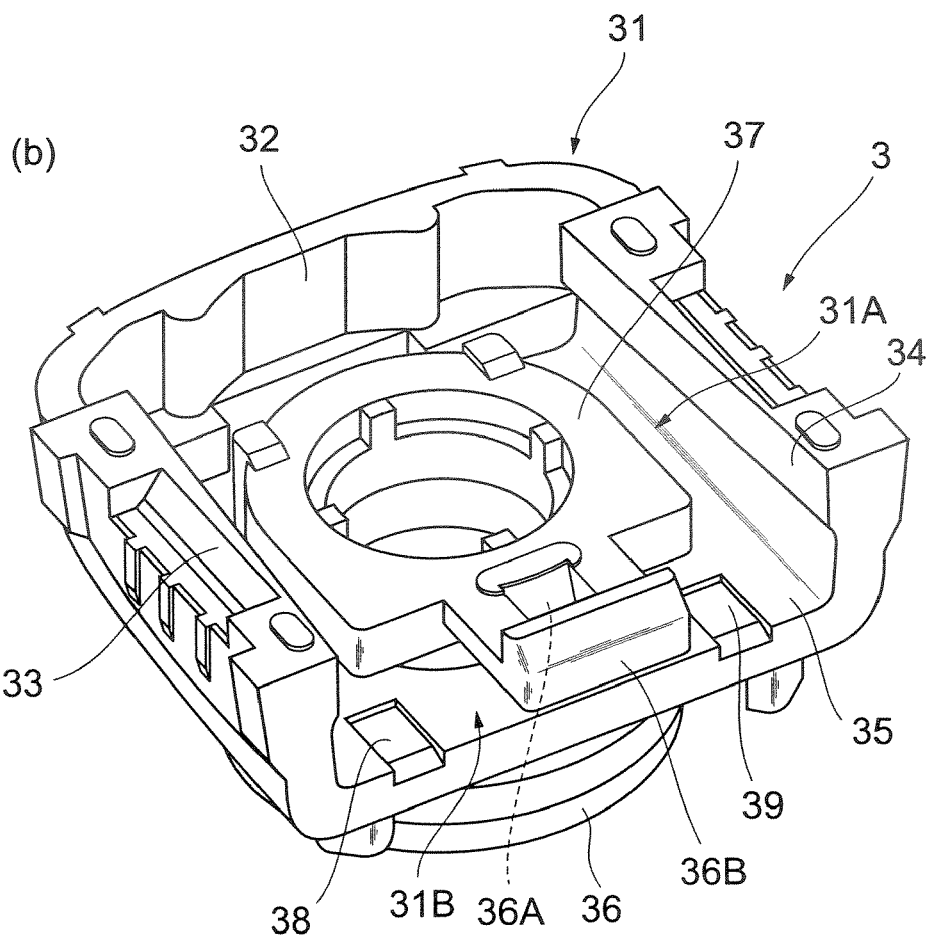

The plate spring 2, as also shown in FIG. 2(a), is composed of a planar portion 21, upright portions 22, 23, and base-retaining pieces 24, 25. These planar portion 21, upright portions 22, 23, and base-retaining pieces 24, 25 are formed by deforming a single metal plate. The planar portion 21 is of a rectangular shape on a plan view, and the upright portions 22, 23 are formed on both sides of the planar portion 21. A through hole 26 is formed in the center of the planar portion 21. The through hole 26 is shaped in a size enough for a projection 37 in the base inner 3, which will be described later, to pass.

The upright portions 22, 23 are formed as standing upright each at an angle of approximately 90° from the both side faces of the planar portion 21. The base-retaining pieces 24, 25 are provided at side edges of the upright portions 22, 23. The base-retaining pieces 24, 25 are biased toward each other in a connecting direction of the upright portions 22, 23 to each other. When the base inner 3 is mounted on the base 1, the base 1 is nipped between the base-retaining pieces 24, 25 and the base 1 is retained in the base inner 3 by biasing forces of the base-retaining pieces 24, 25.

The upright portions 22, 23 are provided with a taper narrowing from back to front. Furthermore, the planar portion 21 is provided with claws 27, 28 serving as a tension applying member. The claws 27, 28 are formed each by cutting a part of the planar portion 21 and they apply a biasing force directed in a cut direction.

The plate spring 2 is coated with a lubricating coating. This coating is made by immersing a metal spring material processed in the shape of the plate spring 2, in a bath filled with a lubricant. A coating agent for the coating can be, for example, a molybdenum disulfide coat ($MoS_2$ coat). When the plate spring 2 is coated with such a coating, the base inner 3 can be mounted as smoothly slid onto the base 1.

Figure 3:
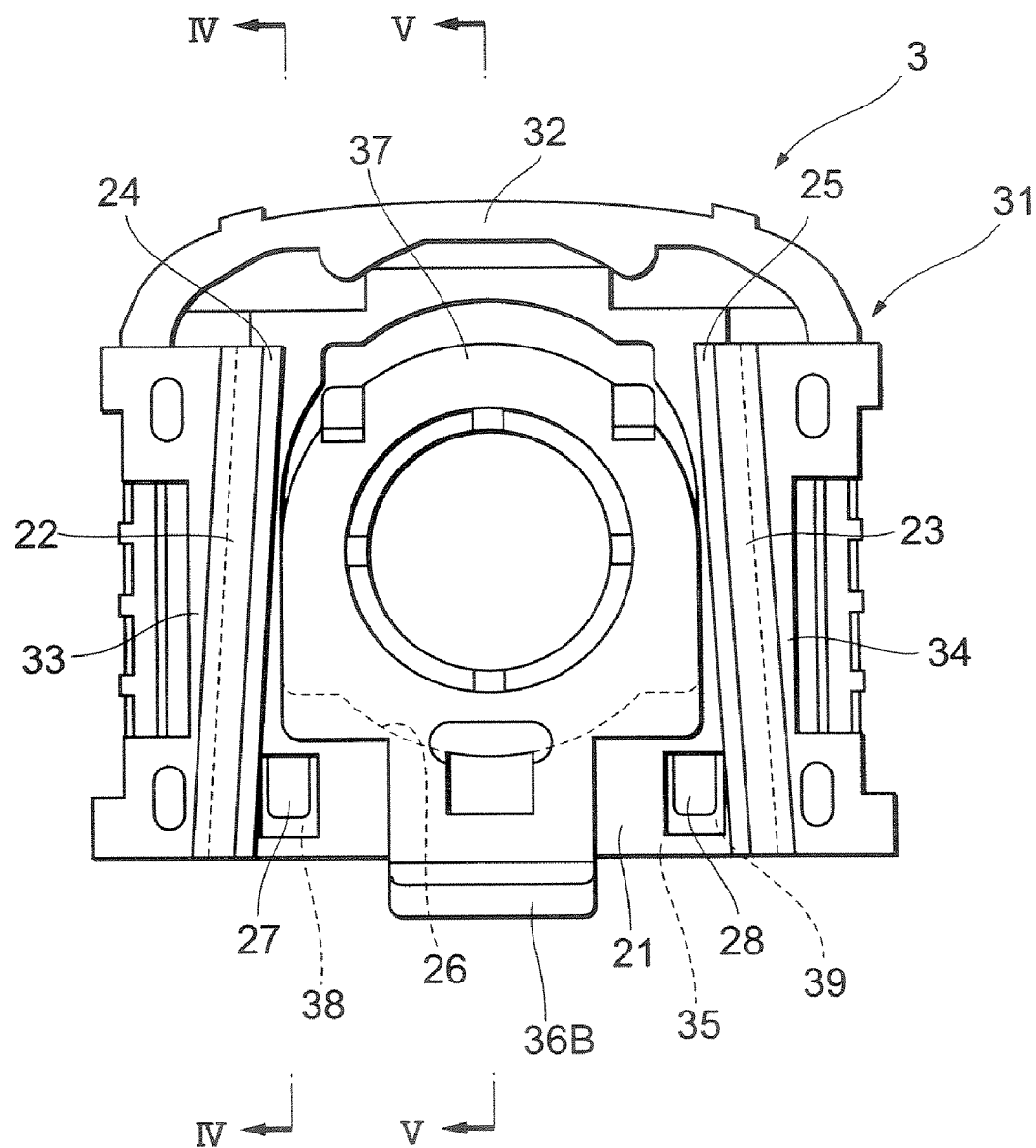
FIG. 3 is a plan view of the base inner.

The base inner 3 is made of resin. The base inner 3, as shown in FIG. 2(b) and FIG. 3, is provided with a case 31, and this case 31 opens in the upper part and in the front part to form an upper opening 31A and a front opening 31B, respectively. A vertical wall 32 is formed in the rear part of the case 31 and side walls 33, 34 are formed on the sides of the case. A bottom plate 35 is formed in the lower part and the planar portion 21 of the plate spring 2 is mounted on this bottom plate 35.

The side walls 33, 34 are also provided with a taper narrowing from back to front, as the upright portions 22, 23 of the plate spring 2 is. The upright portions 22, 23 of the plate spring 2 are located along the side walls 33, 34, respectively. The taper of the side walls 33, 34 has much the same angle as the taper of the upright portions 22, 23, so that the upright portions 22, 23 can be located along the side walls 33, 34.

A socket 36 being a stay mount member is provided in a central region in the bottom plate 35. The socket 36 opens in the bottom and an approximately spherically bored space is formed inside the socket 36. The upper part of the socket 36 constitutes a projection 37 projecting above the bottom plate 35.

Furthermore, grooves 38, 39 are formed on the front upper side of the bottom plate 35 and at positions on both sides of the socket 36. The distance between the grooves 38, 39 is approximately equal to the distance between the claws 27, 28 in the plate spring 2, and the grooves 38, 39 are formed so that the claws 27, 28 can be fitted in the grooves 38, 39, respectively.

Figure 4:
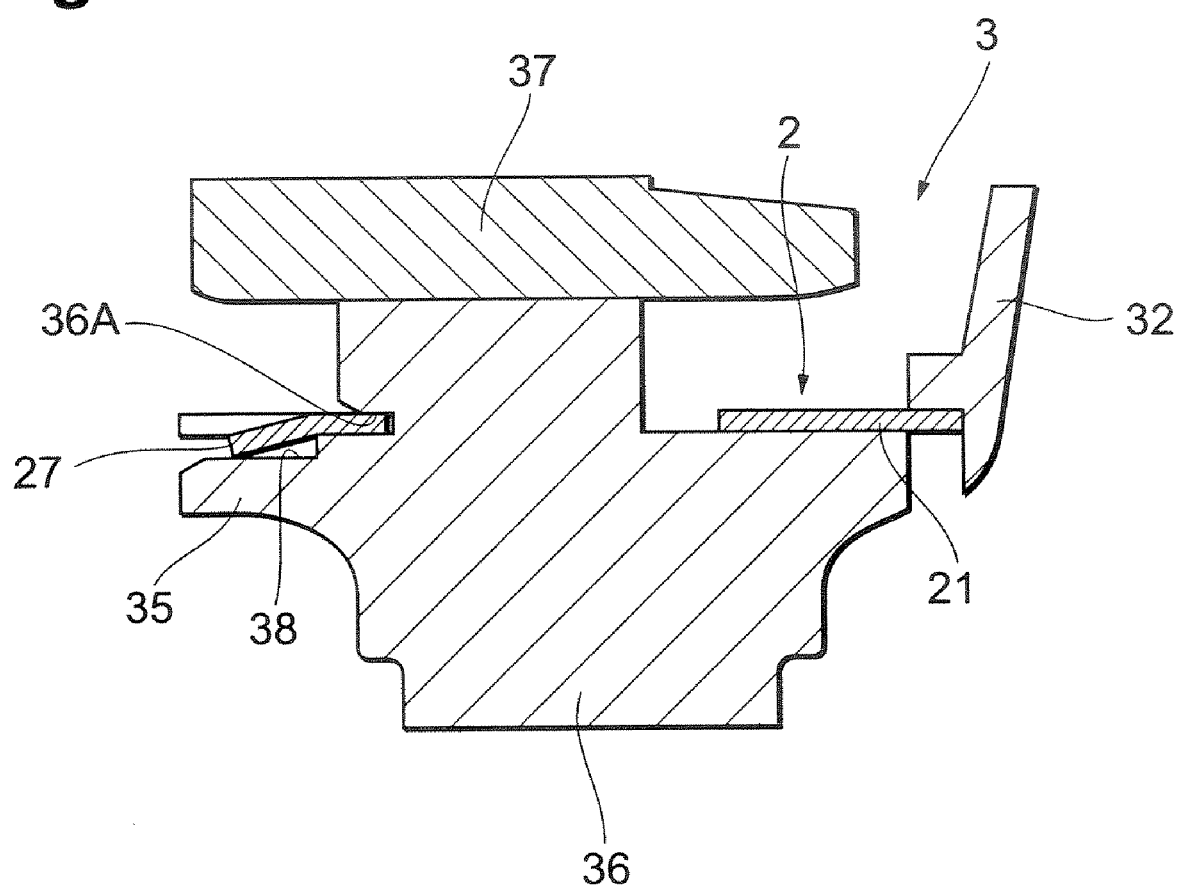
FIG. 4 is a sectional view corresponding to a cross section along line IV-IV in FIG. 3 in a state in which the plate spring is incorporated in the base inner and in which the base inner is mounted on a base.

As shown in FIG. 4, a notch 36A is formed in a front part of a joining part in the socket 36 with the bottom plate 35. The space between the lower surface of this notch 36A and the bottom plate 35 is approximately equal to the thickness of the planar portion 21 in the plate spring 2, and an edge part of the planar portion 21 in the plate spring 2 is pinched by the notch 36A and the bottom plate 35. These notch 36A and the planar portion 21 form the nip part of the present invention.

Figure 5:
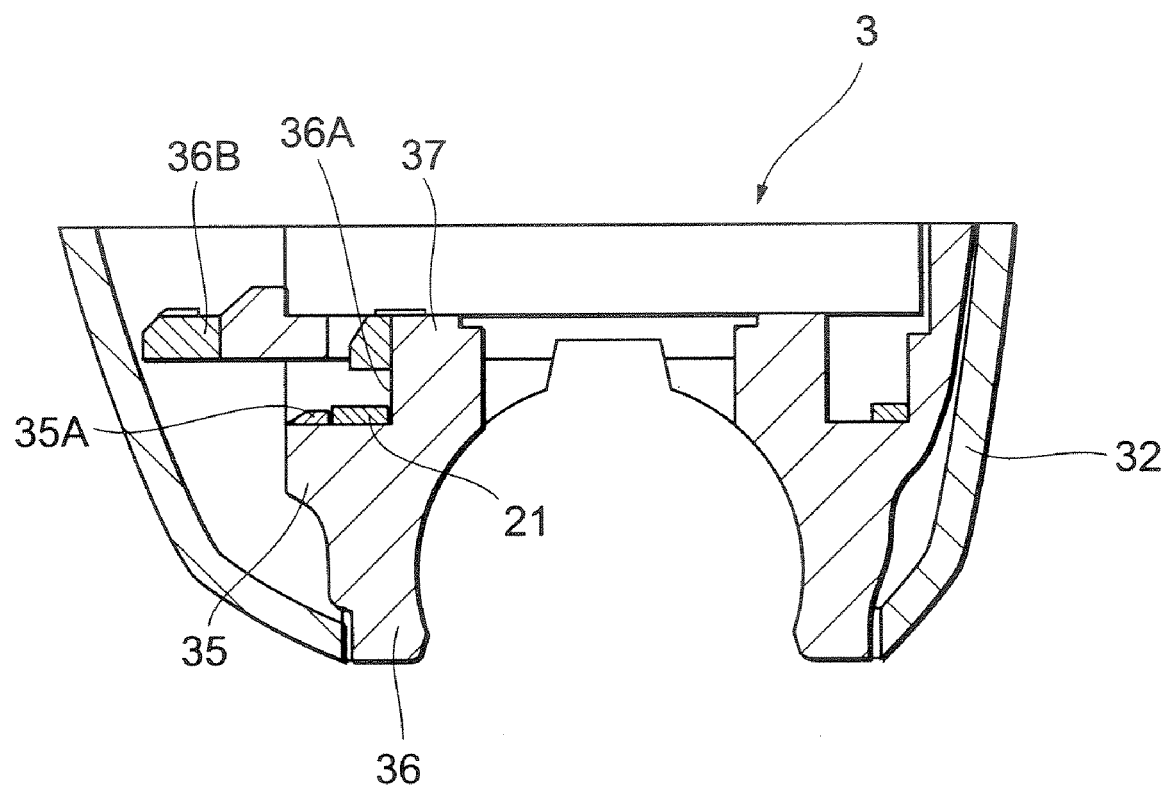
FIG. 5 is a sectional view corresponding to a cross section along line V-V in FIG. 3 in a state in which the plate spring is incorporated in the base inner and in which the base inner is mounted on the base.

Furthermore, as shown in FIG. 5, the bottom plate 35 is provided with a plate spring stopper 35A and the socket 36 is provided with a base stopper 36B. The plate spring stopper 35A projects slightly upward from the bottom plate 35 and a projection amount thereof is approximately equal to the thickness of the planar portion 21 in the plate spring 2. The front face of the plate spring stopper 35A is provided with a taper rising backward, to facilitate movement of the plate spring 2 during incorporation of the plate spring 2. The back face of the plate spring stopper 35A stands approximately vertically to the upper surface of the bottom plate 35 to prevent a slip of the plate spring 2.

The base stopper 36B is also provided with a taper rising backward, in the front face as the plate spring stopper 35A is, and the back face thereof stands approximately vertically to the upper surface of the bottom plate 35. In this manner, the stopper 36B facilitates assembly of the base inner 3 and prevents a slip thereof. Furthermore, the base stopper 36B has such a biasing force that it is bent when pressed downward at the tip and that it returns upward with elimination of the pressing force. In this configuration, the base stopper 36B escapes during the mounting work of the base inner 3 onto the base 1 to further facilitate the mounting of the base inner 3, and, after completion of the mounting, the base stopper 36B returns to prevent a slip off the base 1.

The mirror assembly 4 being the accessory of the present invention is mounted and retained on the base inner 3. The mirror assembly 4 is provided with a stay 5 and a mirror case 6. The stay 5 has a stay body 51 having a bent shape on a side view, a pivot 52 is provided at one end of the stay body 51, and an accessory body pivot (hereinafter referred to as "body pivot") 53 is provided at the other end. The pivot 52 has much the same shape as the inner shape of the socket 36 provided in the base inner 3, and is forced into the socket 36 to be retained therein.

A stay socket 61 is formed in the back face of the mirror case 6. This stay socket 61 has much the same contour as the body pivot 53 of the stay 5. Then the body pivot 53 of the stay 5 is forced into the stay socket 61 of the mirror case 6, to form the mirror assembly 4. A mirror is attached to a front face of the mirror case 6.

Figure 6:
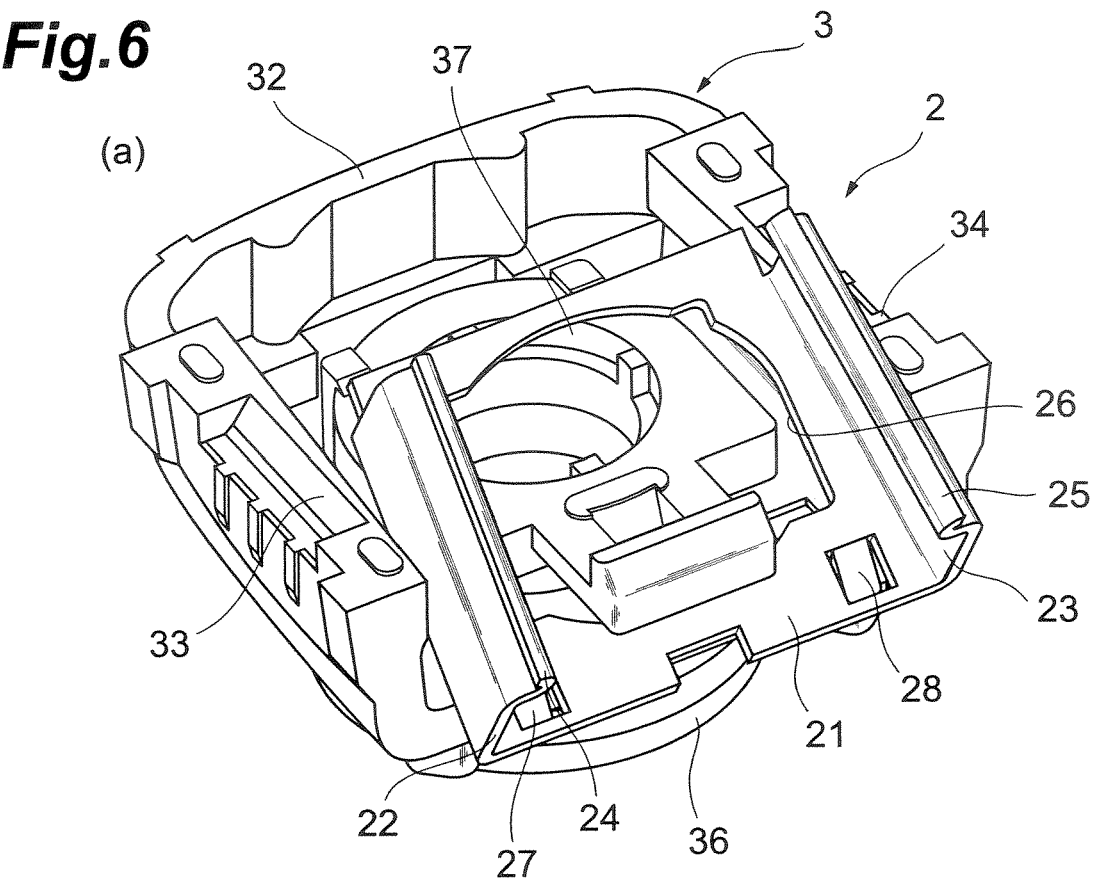
FIG. 6 is a step diagram showing a step of incorporating the plate spring into the base inner.
Figure 6:
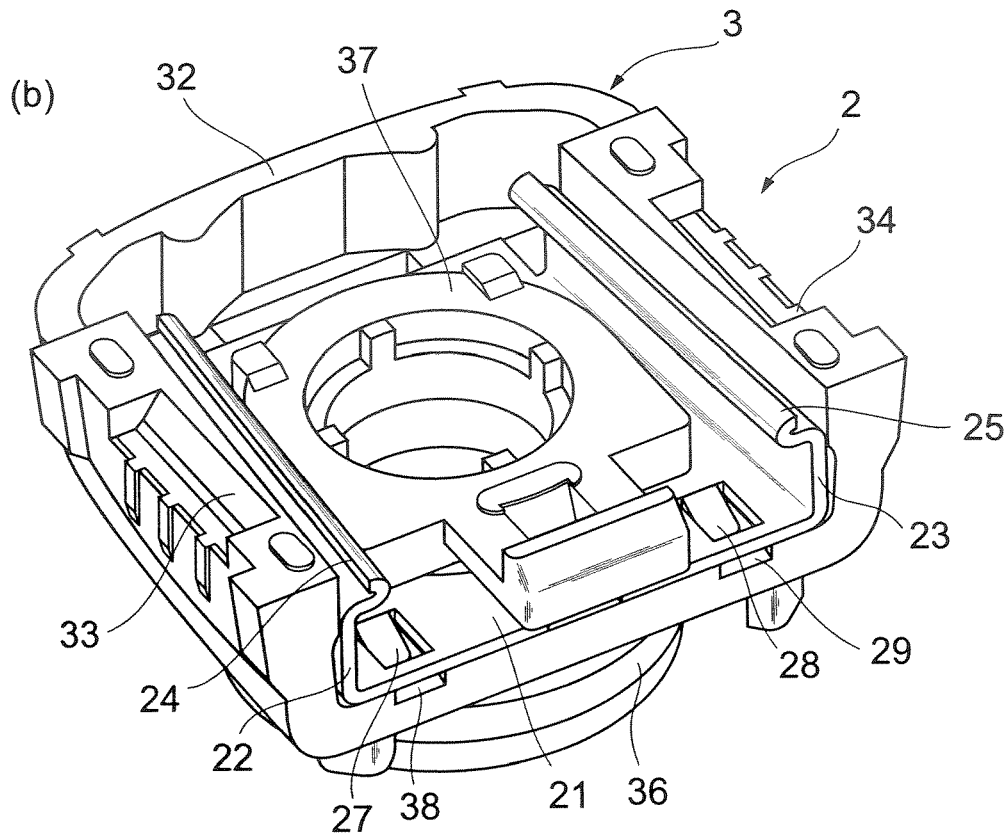
Figure 8:
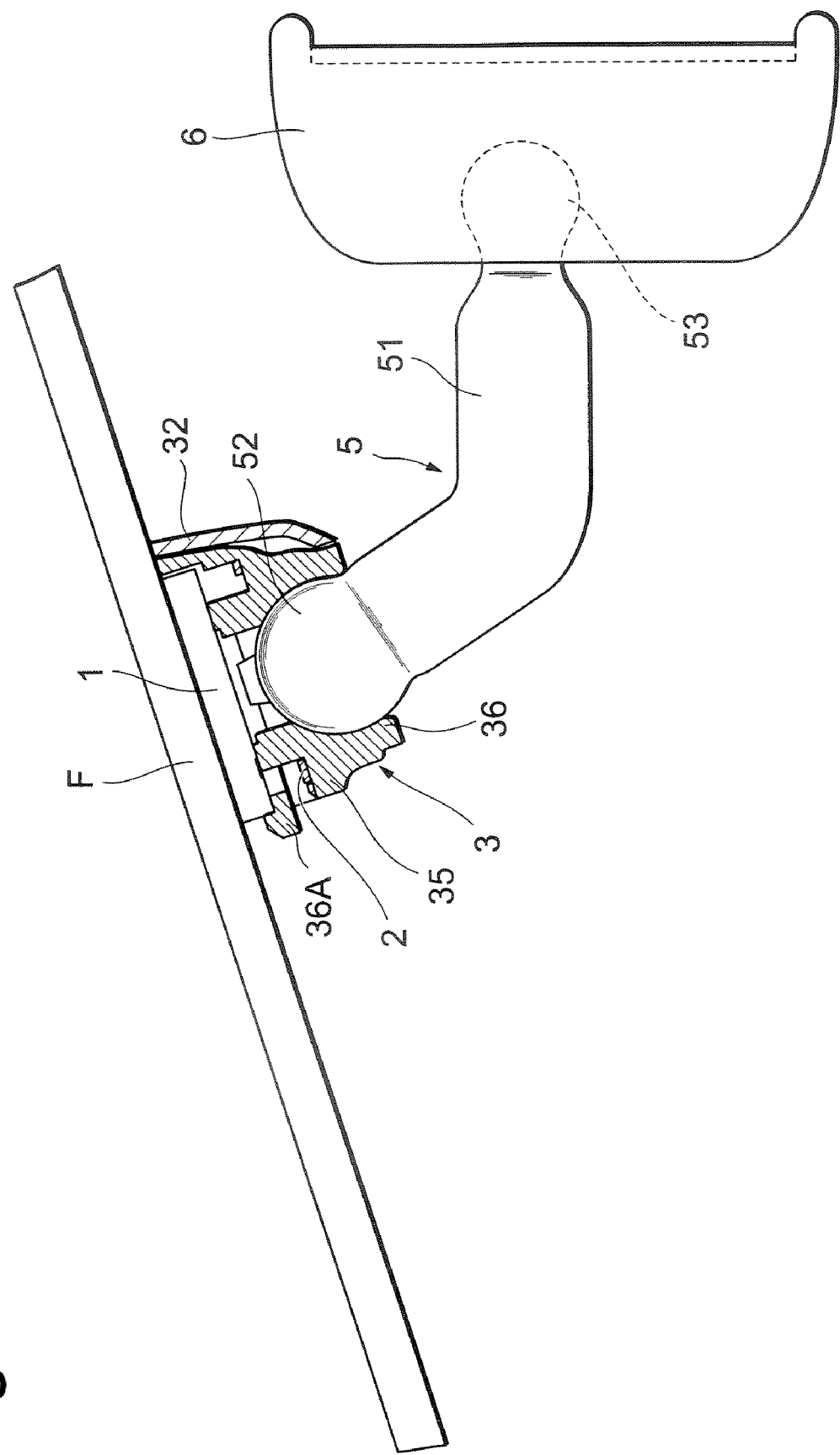
FIG. 8 is a sectional side view of a state in which a mirror assembly is mounted on a windshield of a vehicle.

Let us describe an assembling procedure of the vehicle interior accessory retainer H having the above configuration. In the assembling procedure of the vehicle interior accessory retainer, the base 1 is first bonded and fixed to the windshield F of the vehicle as shown in FIG. 8, with an adhesive or the like. On the other hand, the plate spring 2 is incorporated into the base inner 3. As the plate spring 2 is incorporated into the base inner 3, the projection of the base inner 3 is made to pass through the through hole 26 of the plate spring 2, as shown in FIG. 6(a). In this manner, the back face of the planar portion 21 in the plate spring 2 is mounted on the upper surface of the bottom plate 35 in the base inner 3. Thereafter, as shown in FIG. 6(b), the plate spring 2 is moved while the upright portions 22, 23 of the plate spring 2 are slid along the side walls 33, 34 of the base inner 3. Since the upright portions 22, 23 of the plate spring 2 and the side walls 33, 34 of the base inner both are provided with the taper narrowing from back to front, the plate spring 2 can be readily inserted into the base inner 3.

Figure 7:
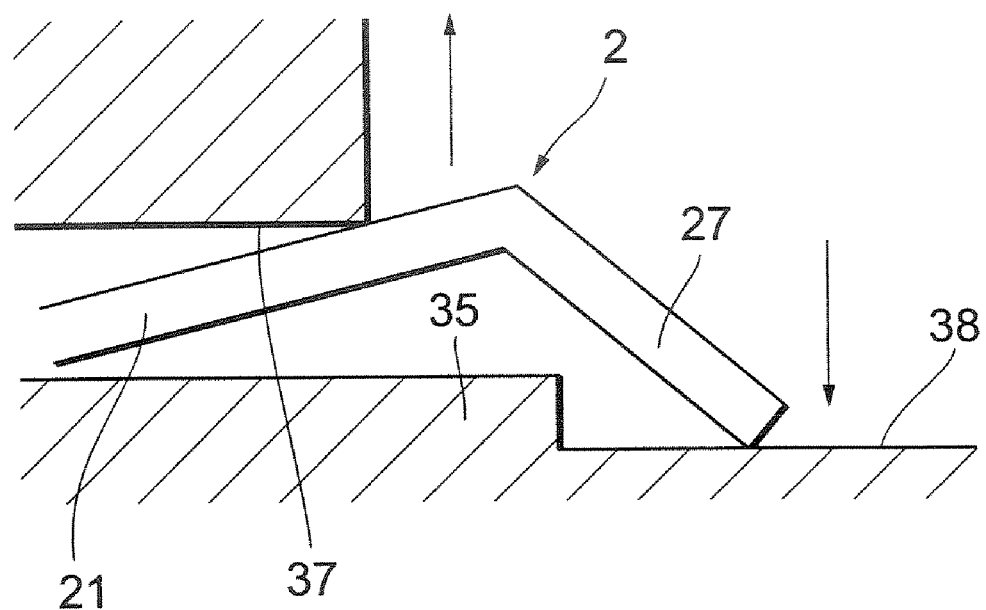
FIG. 7 is a sectional view schematically showing a state in which a tension is applied to the base inner by the plate spring.

As the plate spring 2 is moved to the extreme of movement of the plate spring 2, the claws 27, 28 formed in the planar portion 21 in the plate spring 2 come to be fitted into the grooves 38, 39 in the base inner 3. When the claws 27, 28 are fitted in the grooves 38, 39 in the base inner 3, the plate spring 2 is positioned at the predetermined position relative to the base inner 3. In addition, the end of the planar portion 21 in the plate spring 2 is nipped by the notch 36A of the base inner 3 and the bottom plate 35. At this time, as shown in FIG. 7, a tension is applied to the base inner 3 by the claws 27, 28 in contact with the bottom plate 35 of the base inner 3 and by the planar portion 21 in contact with the notch 36A of the base inner 3. The plate spring stopper 35A prevents the planar portion 21 in the plate spring 2 from slipping off. Therefore, the plate spring 2 is firmly attached to the base inner 3.

While the plate spring 2 is incorporated into the base inner 3, the mirror assembly 4 is assembled. For implementing it, the body pivot 53 of the stay 5 is forced into the stay socket 61 of the mirror case 6 to form the mirror assembly 4. The pivot 52 of the stay 5 in this mirror assembly 4 is forced into the socket 36 formed in the base inner 3. The mirror assembly 4 is incorporated into the base inner 3 in this manner.

After the mirror assembly 4 is mounted on the base inner 3 in this manner, the base inner 3 is mounted as slid onto the base 1, as shown in FIG. 8. In the work of mounting the base inner 3 onto the base 1, the upright portions 22, 23 of the plate spring 2 are slid while kept in contact with the contact surfaces 12, 13 of the base 1. Since the upright portions 22, 23 are provided with the taper narrowing forward, the upright portions 22, 23 can be readily inserted into the base 1.

As the base inner 3 is slid, the end of the base 1 comes to hit the vertical wall 32 of the base inner 3 whereupon the base inner 3 is mounted on the base 1. At this time, the base 1 is retained by the base-retaining pieces 24, 25 of the plate spring 2. In this manner, the vehicle interior accessory retainer H comes to retain the mirror assembly 4.

In the vehicle interior accessory retainer H retaining the mirror assembly 4, as described above, the upper opening 31A and the front opening 31B are formed in the base inner 3. For this reason, the base inner 3 can be readily mounted onto the base 1. The provision of the front opening 31B permits the base inner 3 to be slid and mounted onto the base 1, so as to facilitate the assembling work.

The plate spring 2 is used for retaining the base 1 in the base inner 3. The plate spring 2 is provided with the planar portion 21 arranged along the upper surface of the lower part in the base inner 3, and the upright portions 22, 23 arranged along the side walls 33, 34 in the base inner 3. For this reason, the plate spring 2 can be securely mounted on the base inner 3. In addition, the base-retaining pieces 24, 25 are formed as directed inward from the upright portions 22, 23, and the base 1 is retained in the base inner 3 by the base-retaining pieces 24, 25. For this reason, the base inner 3 becomes resistant to deterioration with age and by heat and the retaining force is maintained. Therefore, it is feasible to prevent reduction in the retaining load.

Since the socket 36 has the projection 37 projecting toward the upper part, it can prevent increase in the size of the base inner 3 itself even if the socket 36 has a large size. Since the plate spring 2 is provided with the through hole 26 for letting the projection 37 pass, interference can be prevented between the plate spring 2 and the projection 37. The claws 27, 28 are formed in the planar portion 21 in the plate spring 2. This permits the plate spring 2 to be mounted more securely on the base inner 3. In addition, since the planar portion in the plate spring 2 is nipped between the projection 37 and the bottom plate 35, the plate spring 2 can be mounted more securely on the base inner 3. Furthermore, since the grooves 38, 39 for the claws 27, 28 to be fitted therein are formed in the bottom plate 35, the plate spring 2 can be securely positioned relative to the base inner 3.

Figure 9:
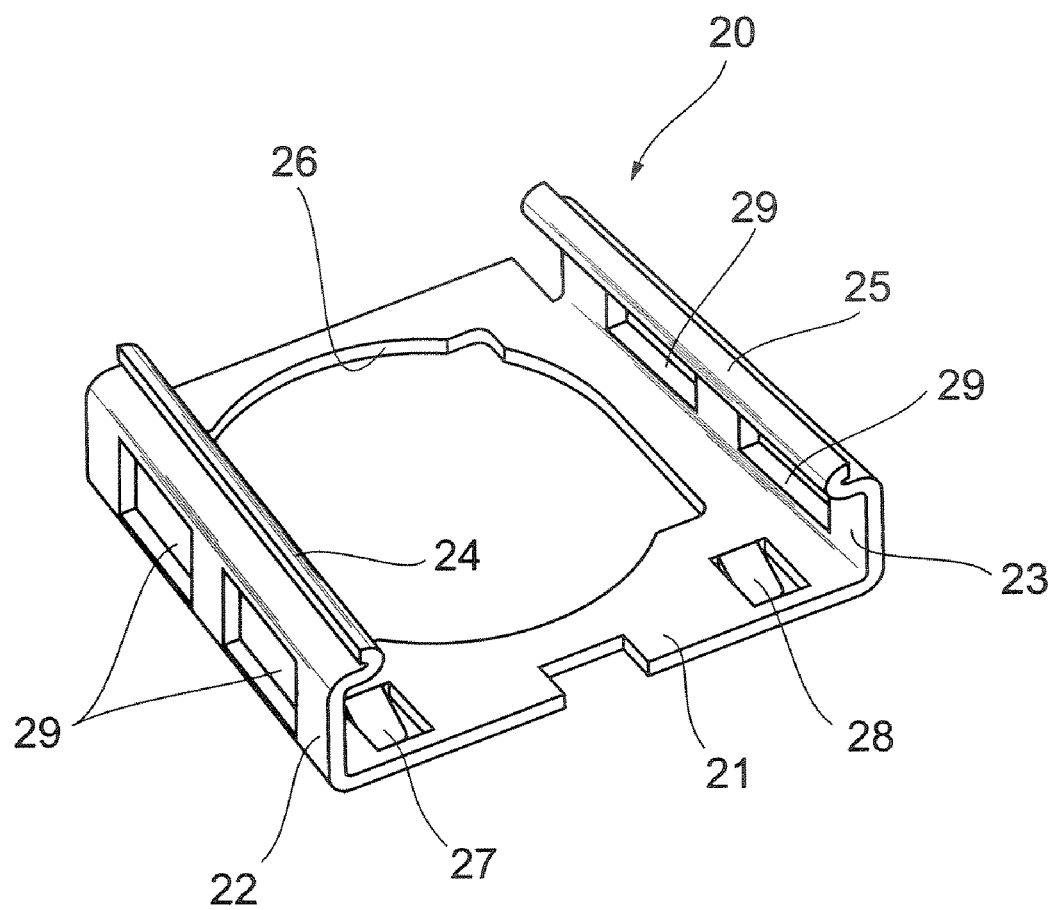
FIG. 9 is a perspective view showing another example of the plate spring.

The above described the preferred embodiment of the present invention, but it is noted that the present invention is by no means intended to be limited to the above embodiment. For example, the plate spring can be constructed in a form shown in FIG. 9. The plate spring 20 shown in FIG. 9 is provided with apertures 29 as a load adjusting structure in each of the base-retaining pieces 24, 25. The retaining force of the base 1 can be adjusted by properly determining the positions and sizes of the apertures 29. The magnitude of the withstand load from the base 1 can be adjusted in this way. The above embodiment showed the configuration wherein the base 1 was fixed to the windshield in the vehicle interior, but the base 1 can be fixed at any other appropriate position, e.g., the ceiling. Furthermore, the above embodiment showed the mirror assembly 4 (inner mirror) as the accessory, but the accessory can also be, for example, a television camera, a cell phone holder, or the like.

What is claimed is:

1. A vehicle interior accessory retainer comprising:

a base to be fixed in a vehicle interior;

a base inner in which an upper opening and a front opening are formed in an upper part and in a front part, respectively, in which side walls are formed in side parts facing each other with the front opening in between in the upper opening, in which a lower part is formed at a position opposite to the upper opening with the side walls in between, and in which a stay mount part, on which a stay in an accessory body is to be mounted, is provided in the lower part; and a plate spring mounted on the base inner and arranged to retain the base in the base inner, wherein the plate spring has a planar portion arranged along an upper surface of the lower part in the base inner, upright portions standing upright from both sides of the planar portion and arranged along the side walls in the base inner, and base-retaining pieces formed as directed inward from the upright portions, the stay mount part has a projection projecting from the lower part toward the upper part of the base inner, and a nip part which nips the planar portion in the plate spring is formed between the projection and the lower part of the base inner, a through hole which lets the projection in the stay mount part pass is formed in the planar portion in the plate spring, and a tension applying part which applies a tension is formed between the upper surface of the lower part in the base inner and the projection in the stay mount part.

2. The vehicle interior accessory retainer according to claim 1, wherein a groove which receives the tension applying part is formed in the upper surface of the lower part in the base inner.

3. The vehicle interior accessory retainer according to claim 2, wherein a load adjusting structure is formed in the upright portions in the plate spring.

4. The vehicle interior accessory retainer according to claim 2, wherein at least one of the base and the plate spring is made of metal.

5. The vehicle interior accessory retainer according to claim 2, wherein the plate spring is coated with a lubricating coating.

6. The vehicle interior accessory retainer according to claim 1, wherein a load adjusting structure is formed in the upright portions in the plate spring.

7. The vehicle interior accessory retainer according to claim 1, wherein at least one of the base and the plate spring is made of metal.

8. The vehicle interior accessory retainer according to claim 1, wherein the plate spring is coated with a lubricating coating.

* * * * *